United States Patent [19]
Cohen

[11] 3,918,810
[45] Nov. 11, 1975

[54] AMBIENT LIGHT EXCLUDING CAMERA ADAPTER WITH VIEWING HOOD

[75] Inventor: David A. Cohen, Hauppauge, N.Y.

[73] Assignee: Venus Scientific Inc., Farmingdale, N.Y.

[22] Filed: Apr. 12, 1974

[21] Appl. No.: 460,536

[52] U.S. Cl. .................... 355/18; 355/20; 355/71
[51] Int. Cl.² ...................................... G03B 29/00
[58] Field of Search ..................... 355/20; 354/122

[56] References Cited
UNITED STATES PATENTS

| | | | |
|---|---|---|---|
| 2,372,430 | 3/1945 | Kals | 354/152 |
| 2,436,103 | 2/1948 | Egan | 355/71 |
| 2,483,147 | 9/1949 | Mol | 355/20 |

Primary Examiner—John M. Horan
Attorney, Agent, or Firm—Ostrolenk, Faber, Gerb & Soffen

[57] ABSTRACT

A camera adapter for enabling simultaneous viewing and photographing of a CRT display, including a sleeve with an opening at one end for the display and at the other end for the camera; a viewing port in the sleeve covered by a hood permits simultaneous viewing and photographing of the display; a light filter of one complementary color disposed in front of the camera lens and a light filter of the complementary color disposed at the viewing port, thereby excluding ambient light from passing through the viewing port through the sleeve and into the camera.

6 Claims, 4 Drawing Figures

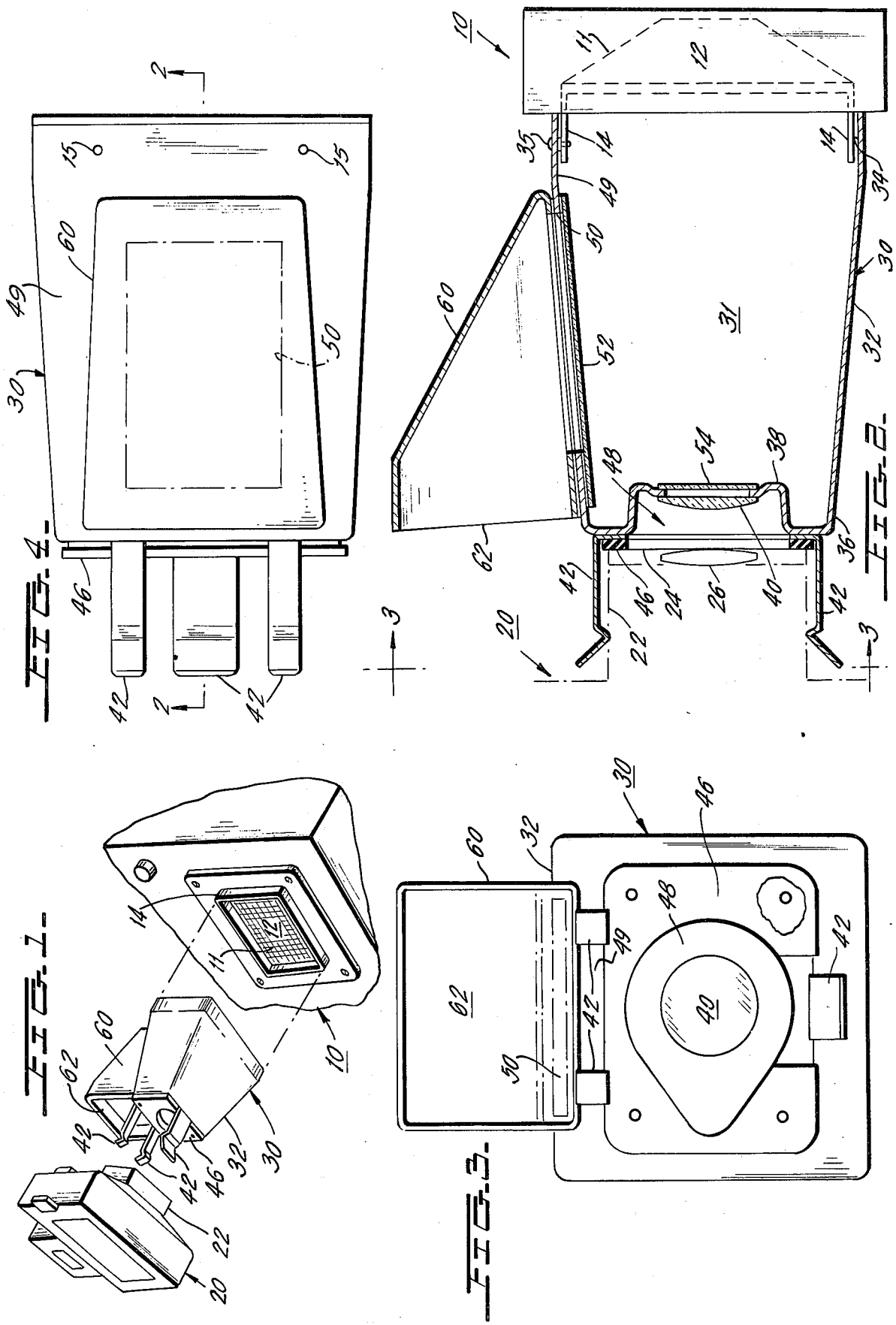

AMBIENT LIGHT EXCLUDING CAMERA ADAPTER WITH VIEWING HOOD

BACKGROUND OF THE INVENTION

Because cathode ray tube (CRT) images are transient, it is often desirable to preserve a particular image by photographing it.

On some CRTs, the image displayed on the screen is faint and in the presence of ambient light, a photograph of the display might not accurately capture significant portions of the image.

Also, certain CRT images travel or scan quite slowly across the screen. It is desirable to photograph the entire image that has passed across the screen. Examples of such slow scanning images are the trace of an oscilloscope, or a typical slow scan television monitor display which may require, for example, eight seconds to scan across the entire screen. In order to photograph one entire scan, the camera shutter must remain open throughout the scan. However, the prolonged shutter opening required for completion of the scan will admit so much ambient light through the camera shutter that the image on the CRT display is unlikely to be recorded, or if it is recorded, it is unlikely to be recorded properly.

While the image on the CRT display is being photographed, it is helpful for the photographer to be able to simultaneously view the display in order to be able to note any significant changes in the display and, more important, in order to be able to start and stop the photographing process in order that only a single scan might be recorded.

STATE OF THE ART

In order to exclude ambient light while a CRT display is being photographed, it is known to provide an adapter or hood which encloses and excludes ambient light from the space between the CRT display and the camera lens, as for example, in U.S. Pat. No. 3,696,720.

Any means which permits simultaneous photographing and viewing of the CRT display by an operator will tend to admit ambient light to the space between the display and the camera lens. Thus, often no means is provided to permit simultaneous viewing of the display while it is being photographed. Alternatively, the viewing means that is provided is shaped in an effort to exclude ambient light, e.g. there is a narrowly confined opening or viewing means. Another ambient light excluding alternative is to provide a mechanically closable viewing port which is closed immediately prior to taking the photograph. However, this precludes viewing of the CRT display during photographing.

It is desirable to provide a separate relatively large size viewing port for the camera adapter which port would enable easy viewing of the entire display during photographing. It is known to provide a viewing port through the side of the camera adapter, while the CRT display is at one end of the adapter and the camera lens is connected at the other end of the adapter. It is also known to provide a covering hood over the viewing port so as to exclude a substantial portion of the ambient light, wherein the hood is oriented and of a size to permit viewing through the viewing port in a direction which would enable viewing only of the display. However, it is desirable that the protective hood have a large enough entrance opening that there could be easy viewing of the CRT display and such entrance opening still will admit considerable ambient light.

One system already known in the prior art for protecting against ambient light passing through the viewing port and into the camera lens is to position one polarizing light filter in or near the viewing port, whereby all ambient light entering the space between the display and the camera will be polarized, and to position a crossed polarizing light filter in front of the camera lens. The latter filter blocks all of the polarized ambient light in the space between the display and the camera from passing to the camera lens. In this arrangement, because the viewing port, CRT display and camera lens may not all be aligned and parallel and because arranging polarizing filters precisely to cross is quite exacting, proper orientation and alignment of the polarizing filters, which is critical in order to block all ambient light from entering the camera lens, can become quite time consuming and will likely require testing of each unit, with consequent relatively high costs of manufacture.

SUMMARY OF THE INVENTION

To prevent ambient light from entering the lens of the camera photographing the CRT display, the adapter in accordance with the invention has subtractive color filters interposed between the viewing port and the camera lens to color filter out all of the ambient light. one subtractive color filter is positioned in the viewing port or at least between the viewing port and the space between the CRT display and the camera lens. A complementary subtractive color filter is placed in front of the camera lens or at least in a position such that all ambient light will have passed through both of the subtractive complementary filters.

The ambient light excluding means just described has the advantage that it permits simultaneous viewing of the CRT display while the camera shutter is opened and the means itself is easy to manufacture and does not require complex orientation procedures or separate testing of every one of the units and can be manufactured at quite low cost.

Accordingly, it is the primary object of the present invention to permit simultaneous viewing and photographing of a CRT display.

It is another object of the invention to permit such photographing without ambient light entering the camera lens.

It is a further object of the invention to provide a means which enables such photographing.

These and other objects of the invention will become apparent from the following description of the accompanying drawings.

BRIEF DESCRIPTION OF THE DRAWINGS

FIG. 1 is an exploded perspective view of an adapter in accordance with the invention and the CRT device and camera with which it is used;

FIG. 2 is a cross-sectional view in side elevation of the adapter in accordance with the invention, along the line and in the direction of arrows 2 in FIG. 4;

FIG. 3 is an end view of the adapter; and

FIG. 4 is a top plan view of the adapter.

DETAILED DESCRIPTION OF THE INVENTION

Referring to FIGS. 1 and 2, oscilloscope or other device 10 having a CRT display incorporates a conventional cathode ray tube (CRT) 11 with a CRT display or screen 12 and well known means for operating the CRT to produce on screen 12 a trace or any other image of which it is desired to take a photograph. Screen 12 is rectangular and of known dimensions, although the shape and size of the screen is variable dependent upon the particular model oscilloscope or other device 10 that is chosen. Attached to oscilloscope 10, projecting forwardly from its front side and completely surrounding the screen 12 is bezel or rim 14. Bezel 14 engages the end of below described adapter 30 and cooperates with the adapter to exclude ambient light from space 31 between screen 12 and the lens of the camera.

In order to photograph the image displayed on screen 12, conventional camera 20 is provided. One example of an appropriate camera for use with the invention is a Polaroid Color Pack II camera, wherein a self-developing feature is included so that the photograph is available shortly after exposure. Other conventional cameras may be used. The setting of the shutter opening should be chosen to ensure that the entire scan can be recorded. Similarly, the shutter speed should be controllable by the operator by conventional means so that the shutter can be held open to enable the entire scan to be photographed.

The forwardly projecting front portion 22 of camera 20 ends in the front surface 24 of the camera and camera lens 26 is set in or slightly back from front surface 24.

Camera adapter 30 in accordance with the invention comprises a light impervious sleeve 32, which is tapering in cross-section so as to be able to receive bezel 14 at one end and camera forward projection 22 at the other end. To match the rectangular shape of screen 12 and its peripheral bezel 14 and the rectangular shape of the forward portion 22 of camera 20, sleeve 32 is generally rectangular in cross-section.

The wide end portion 34 of sleeve 32 engages oscilloscope bezel 14 around its entire circumference to preclude entrance of ambient light around this connection into hollow space 31 within sleeve 32. Portion 34 of sleeve 32 may be supported within or without rim 14 as a particular apparatus requires or another connection between end portion 34 and bezel 14 or its equivalent on an oscilloscope may be provided so long as the ambient light excluding purpose is realized. Bezel 14 is held to sleeve 32 by a plurality of spaced fastening means 35.

Referring to all of the drawings, at the other end 36 of sleeve 32, the sleeve is shaped to define a support 38 for close-up lens 40, which provides proper magnification and focus of the image on screen 12 for lens 26 of camera 20. The position and design of lens 40 is coordinated with the length of sleeve 32 to ensure a predetermined focus for camera 20.

Spring clip 42 is fastened to the lens carrying end 36 of sleeve 32. The clip holds the forward projection 22 of camera 20 in position and clip 42 is spring biased to preferably draw the camera toward space 31 and thereby to force the forward surface 24 of camera 20 against the resilient material sealing gasket 46, which surrounds aperture 48 that communicates to lens 26. Gasket 46 provides an ambient light seal to keep ambient light from leaking past the connection between camera 20 and sleeve 32 into space 31.

Wall 49 of sleeve 32 has a relatively large size viewing port opening 50 passing therethrough. An operator standing near camera 20 can look through viewing port 50 and observe the image on screen 12.

It is desired to prevent the ambient light which would normally enter space 31 through viewing port 50 from also entering camera lens 26 and destroying the photograph of the image on screen 12. In accordance with the invention, light. One subtractive color filter first subtractive color, light transmitting filter 52 is secured to sleeve wall 49 and extends completely across opening 50. A complementary, color subtractive, light transmitting filter 54 covers lens 40. Ambient light includes light of all colors. But, filter 52 subtracts color from the light entering space 31 through viewing port 50. The light in space 31 is only of the color transmitted by color filter 52. Camera 20 views screen 12 through complementary color filter 54 and the latter filter will not pass the already filtered ambient light in space 31. The two filters 52, 54 completely eliminate ambient light from the image field seen by camera 20, whereby the camera only photographs the image on screen 12, without being affected by ambient light.

In a typical application, where white light is emitted by the CRT, the two filters would be green in color for filter 52 and red in color for filter 54. If apparatus 10 produces a television picture display and is a slow scan television, the image on screen 12 is usually a shade of yellow in color. The filters then chosen for maximum ambient light rejection and maximum passage of the yellow color image would be a blue filter 52 at the viewing port and an amber color filter 54 at the camera. In general, any two of the three additive primary colors, red, green or blue, may be used.

In order to exclude unnecessary ambient light and to direct the viewer's direction of view toward the screen 12, viewing port 50 is shielded by a hollow hood 60 with an enlarged opening 62 through which viewing port 50 and screen 12 may be easily viewed. Hood 60 is fastened to the exterior of sleeve wall 49.

There has just been described a novel adapter for use in simultaneously photographing and observing the display on a CRT, wherein ambient light which enters the space between the CRT screen and the camera through a viewing port is prevented from being photographed by the use of complementary subtractive color filters, one filter between the viewing port and the space and one filter between the space and the camera.

Although the present invention has been described in connection with a preferred embodiment thereof, many variations and modifications will now become apparent to those skilled in the art. It is preferred, therefore, that the present invention be limited not by the specific disclosure herein, but only by the appended claims.

I claim:

1. In combination, an adapter for enabling camera photographing and simultaneous viewing of a CRT display, a CRT display means, and a camera;
   said adapter comprising a light impervious hollow sleeve defining a space within it and having one open end to communicate with a CRT display and another open end to communicate with the lens of a photographic camera; said sleeve having at least one side; a viewing port through said side of said sleeve; said port being positioned to permit direct viewing of the CRT display by looking directly through said port and through said sleeve one open end; a first light filter interposed to be between said viewing port and said sleeve space and a second light filter interposed in the space between said open ends of said sleeve having only said second light filter therein as a light attenuation means; said first filter being of one light subtractive color and said second filter being of a complementary light subtractive color, thereby to prevent ambient light which passes through said viewing port to pass through said space into said camera;

said CRT display means including a screen; said CRT display means being positioned at said sleeve one opening with said CRT display means screen being directed inwardly to said sleeve space;

said camera including a lens that is positioned at said sleeve other opening with said lens being directed inwardly to said sleeve space and toward said CRT display means screen;

and ambient light sealing means for joining said CRT display means to said sleeve at said one opening and for joining said camera to said sleeve at said other opening;

said CRT display means comprising a slow scan television whose said screen displays an image having a yellowish color;

said first filter being blue in color and said second filter being amber in color.

2. In combination, an adapter for enabling camera photographing and simultaneous viewing of a CRT display, a CRT display means, and a camera;

said adapter comprising a light impervious hollow sleeve defining a space within it and having one open end to communicate with a CRT display and another open end to communicate with the lens of a photographic camera; said sleeve having at least one side; a viewing port through said side of said sleeve; said port being positioned to permit direct viewing of the CRT display by looking directly through said port and through said sleeve one open end; a first light filter interposed to be between said viewing port and said sleeve space and a second light filter interposed in the space between said open ends of said sleeve having only said second light filter therein as a light attenuation means; said first filter being of one light subtractive color and said second filter being of a complementary light subtractive color, thereby to prevent ambient light which passes through said viewing port to pass through said space into said camera;

said CRT display means including a screen; said CRT display means being positioned at said sleeve one opening with said CRT display means screen being directed inwardly to said sleeve space;

said camera including a lens that is positioned at said sleeve other opening with said lens being directed inwardly to said sleeve space and toward said CRT display means screen;

and ambient light sealing means for joining said CRT display means to said sleeve at said one opening and for joining said camera to said sleeve at said other opening;

one said filter being an additive primary color-red, green or blue and the other said filter being a different additive primary color-red, green or blue.

3. The combination of claim 2, wherein said light sealing means for said CRT display means comprises a bezel around the circumference of said screen for sealingly engaging said sleeve at said one opening and said sealing means for said camera comprises a sealing gasket around said second opening and includes means for holding said camera against said sealing gasket therefor.

4. The combination of claim 2, wherein said adapter further comprises a covering hood over said viewing port, said hood having a large viewing opening therein that is oriented to enable viewing through said viewing port of a CRT display image that is at said one opening.

5. The combination of claim 4, wherein said adapter further includes a lens in said space between said one and said other openings to focus a CRT display image which is at said one opening on a camera lens which is at said other opening.

6. The combination of claim 5, wherein in said adapter, said first filter is held to said sleeve side at said viewing port and covers said viewing port and said second filter is at said focusing lens of said adapter.

* * * * *